United States Patent
Chen et al.

(10) Patent No.: US 12,511,767 B2
(45) Date of Patent: Dec. 30, 2025

(54) MULTI-VIEW STEREO WITH LEARNABLE COST METRIC FOR 3D RECONSTRUCTION

(71) Applicant: Hong Kong Centre for Logistics Robotics Limited, Hong Kong (CN)

(72) Inventors: Ben M. Chen, Hong Kong (CN); Guidong Yang, Hong Kong (CN); Chuanxiang Gao, Hong Kong (CN); Xi Chen, Hong Kong (CN); Jihan Zhang, Hong Kong (CN); Benyun Zhao, Hong Kong (CN)

(73) Assignee: HONG KONG CENTRE FOR LOGISTICS ROBOTICS LIMITED, Hong Kong (CN)

( * ) Notice: Subject to any disclaimer, the term of this patent is extended or adjusted under 35 U.S.C. 154(b) by 333 days.

(21) Appl. No.: 18/351,499

(22) Filed: Jul. 13, 2023

(65) Prior Publication Data
US 2025/0022153 A1    Jan. 16, 2025

(51) Int. Cl.
*G06T 7/593* (2017.01)
*G06T 3/18* (2024.01)
(Continued)

(52) U.S. Cl.
CPC .............. *G06T 7/593* (2017.01); *G06T 3/18* (2024.01); *G06T 7/55* (2017.01); *G06T 7/579* (2017.01);
(Continued)

(58) Field of Classification Search
CPC . G06T 2207/20084; G06T 2207/20081; G06T 2207/10028; G06T 2207/10024; G06T 2207/10016; G06T 7/593; G06T 19/006; G06T 5/50; G06T 7/70; G06T 2207/10012; G06T 17/00; G06T 7/50; G06T 2207/20016; G06T 7/246; G06T 7/20; G06T 7/73; G06T 2207/30244; G06T 7/55; G06T 2207/20221; G06T 7/90; G06T 2200/04; G06T 7/579; G06T 15/08; G06T 2207/30252; G06T 7/80; G06T 2207/10021; G06T 15/20; G06T 2200/08; G06T 7/75; G06T 7/33; G06T 19/00;
(Continued)

(56) References Cited

PUBLICATIONS

Yao, Yao, et al. "Mvsnet: Depth inference for unstructured multi-view stereo." Proceedings of the European conference on computer vision (ECCV). 2018. (Year: 2018).*
(Continued)

*Primary Examiner* — Xiao M Wu
*Assistant Examiner* — Scott E Sonners
(74) *Attorney, Agent, or Firm* — EAGLE IP LIMITED

(57) ABSTRACT

A deep learning network can perform three-dimensional (3D) image reconstruction of a scene from multi-view calibrated two-dimensional (2D) images. The network can include a convolutional neural network that performs feature extraction to generate feature pyramids corresponding to features at different levels of resolution. The feature pyramids can be used to compute a respective cost volume for each feature pyramid at each level of resolution, with the cost volume incorporating a learnable parameter that corresponds to a weight allocated to the "reference" feature pyramid relative to other feature pyramids. A depth map for each input image can be generated based at least in part on the cost volume.

20 Claims, 8 Drawing Sheets

(51) Int. Cl.
G06T 7/55 (2017.01)
G06T 7/579 (2017.01)
G06T 7/62 (2017.01)

(52) U.S. Cl.
CPC ...... *G06T 7/62* (2017.01); *G06T 2207/10028* (2013.01); *G06T 2207/20016* (2013.01); *G06T 2207/20081* (2013.01); *G06T 2207/20084* (2013.01); *G06T 2207/20216* (2013.01); *G06T 2207/20221* (2013.01)

(58) Field of Classification Search
CPC ....... G06T 3/4046; G06T 7/596; G06T 9/002; G06T 7/85; G06T 5/60; G06T 7/174; G06T 7/97; G06T 7/292; G06T 7/207; G06T 7/00; G06T 7/285; G06T 7/38; G06T 2207/20228; G06T 2207/20212; G06T 3/14; G06V 10/82; G06V 10/764; G06V 20/56; G06V 20/20; G06V 10/454; G06V 20/64; G06V 40/172; G06V 10/44; G06V 10/40; G06N 3/045; G06N 3/08; G06N 20/00; G06N 3/0464; H04N 2013/0081; H04N 13/243
See application file for complete search history.

(56) References Cited

PUBLICATIONS

Yao, Yao, et al. "Recurrent mvsnet for high-resolution multi-view stereo depth inference." Proceedings of the IEEE/CVF conference on computer vision and pattern recognition. 2019. (Year: 2019).*
Gu, Xiaodong, et al. "Cascade cost volume for high-resolution multi-view stereo and stereo matching." Proceedings of the IEEE/CVF conference on computer vision and pattern recognition. 2020. (Year: 2020).*
Wei, Zizhuang, et al. "Aa-rmvsnet: Adaptive aggregation recurrent multi-view stereo network." Proceedings of the IEEE/CVF international conference on computer vision. 2021. (Year: 2021).*
Yang, Jiayu, et al. "Cost volume pyramid based depth inference for multi-view stereo." Proceedings of the IEEE/CVF conference on computer vision and pattern recognition. 2020. (Year: 2020).*
Chen, Po-Heng, et al. "MVSNet++: Learning depth-based attention pyramid features for multi-view stereo." IEEE Transactions on Image Processing 29 (2020): 7261-7273. (Year: 2020).*
Li, Junjie, et al. "Feature pyramid multi-view stereo network based on self-attention mechanism." Proceedings of the 2022 5th International Conference on Image and Graphics Processing. 2022 (Year: 2022).*
Yu, Anzhu, et al. "Attention aware cost volume pyramid based multi-view stereo network for 3d reconstruction." ISPRS Journal of Photogrammetry and Remote Sensing 175 (2021): 448-460 (Year: 2021).*
Zhang, Jingyang, et al. "Visibility-aware multi-view stereo network." arXiv preprint arXiv:2008.07928 (2020). (Year: 2020).*
Yang G, Liu K, Zhang J, et al. Datasets and processing methods for boosting visual inspection of civil infrastructure: A comprehensive review and algorithm comparison for crack classification, segmentation, and detection. Construction and Building Materials, 2022, 356: 129226.
Yang G, Liu K, Zhao Z, et al. Datasets and methods for boosting infrastructure inspection: A survey on defect classification. 2022 IEEE 17th international conference on control & automation (ICCA). IEEE, 2022: 15-22.
Zhang J, Wang R, Yang G, et al. Sim-in-Real: Digital Twin Based UAV Inspection Process. 2022 International Conference on Unmanned Aircraft Systems (ICUAS). IEEE, 2022: 784-801.
Yang G, Mentasti S, Bersani M, et al. LiDAR point-cloud processing based on projection methods: a comparison. 2020 International Conference of Electrical and Electronic Technologies for Automotive (AUTOMOTIVE). IEEE, 2020: 1-6.
Zhang S, Yang G, Wang Y, et al. Objective evaluation for the driving comfort of vehicles based on BP neural network. 2020 4th CAA International Conference on Vehicular Control and Intelligence (CVCI). IEEE, 2020: 737-742.

* cited by examiner

*400*

---
Algorithm 1: Matching Score Computation

Input : $\{\mathbf{p}_{ij} \in \mathbb{R}^{3\times 1}, j \in \{0, 1, ..., n_i - 1\}\}_{i=1}^{N}$;
Reference-view and source-view camera extrinsics $\mathbf{R}_0 \in \mathbb{R}^{3\times 3}$, $\mathbf{t}_0 \in \mathbb{R}^{3\times 1}$, $\{\mathbf{R}_i\}_{i=1}^{N} \in \mathbb{R}^{3\times 3}$, $\{\mathbf{t}_i\}_{i=1}^{N} \in \mathbb{R}^{3\times 1}$.

Output : Matching score $\{S_i\}_{i=1}^{N}$ between $\mathbf{I}_0$ and $\{\mathbf{I}_i\}_{i=1}^{N}$.

Initialization: Favoring baseline angle $\theta_0 = 5°$;
Standard deviation of the piecewise gaussian function $\sigma_1 = 1$ and $\sigma_2 = 10$;
Matching score $S_i = 0$.

Reference-view camera center $\mathbf{c}_0 = -\mathbf{R}_0^T \mathbf{t}_0$;

for $i = 1$ to $N$ do
    Source-view camera center $\mathbf{c}_i = -\mathbf{R}_i^T \mathbf{t}_i$;
    for $j = 0$ to $n_i - 1$ do
        $\theta_j = \frac{180°}{\pi} \arccos \frac{(\mathbf{c}_0 - \mathbf{p}_{ij}) \cdot (\mathbf{c}_i - \mathbf{p}_{ij})}{\|\mathbf{c}_0 - \mathbf{p}_{ij}\|_2 \|\mathbf{c}_i - \mathbf{p}_{ij}\|_2}$
        if $\theta_j \leq \theta_0$ then
            $S_i = S_i + \exp(-\frac{(\theta_j - \theta_0)^2}{2\sigma_1^2})$
        else
            $S_i = S_i + \exp(-\frac{(\theta_j - \theta_0)^2}{2\sigma_2^2})$ return $S_i$
---

FIG. 4

| Type | Methods | Mean Error Distance | | |
|---|---|---|---|---|
| | | ACC. ↓ (mm) | Comp. ↓ (mm) | Overall ↓ (mm) |
| Traditional | Furu | 0.613 | 0.941 | 0.777 |
| | Tola | 0.342 | 1.190 | 0.766 |
| | Camp | 0.835 | 0.554 | 0.695 |
| | Gipuma | 0.283 | 0.873 | 0.578 |
| | Colmap | 0.400 | 0.664 | 0.532 |
| Learning | SurfaceNet | 0.450 | 1.040 | 0.745 |
| | MVSNet | 0.396 | 0.527 | 0.462 |
| | R-MVSNet | 0.385 | 0.459 | 0.422 |
| | Vis-MVSNet | 0.369 | 0.361 | 0.365 |
| | IterMVS | 0.373 | 0.354 | 0.363 |
| | AA-RMVSNet | 0.376 | 0.339 | 0.357 |
| | PVA-MVSNet | 0.379 | 0.336 | 0.357 |
| | AttMVS | 0.383 | 0.329 | 0.356 |
| | CasMVSNet | 0.325 | 0.385 | 0.355 |
| | EPP-MVSNet | 0.413 | 0.296 | 0.355 |
| | Ours | 0.356 | 0.272 | 0.314 |

↓ The ↓ means that the smaller value indicates the better MVS performance.

FIG. 5

MULTI-VIEW STEREO WITH LEARNABLE COST METRIC FOR 3D RECONSTRUCTION

FIELD OF INVENTION

This disclosure relates generally to stereo imaging and in particular to reconstruction of three-dimensional (3D) point clouds from multiple two-dimensional (2D) images of a scene using a learnable cost metric.

BACKGROUND OF INVENTION

Multi-view stereo reconstruction (MVS) refers generally to processes for inferring depth or three-dimensional positions of objects or points in a scene. Two or more images of a scene containing target objects are collected from spatially separated locations, and the images can be compared using various algorithms to infer depth information. In traditional MVS, features associated with objects, such as corners or edges of surfaces (e.g., walls of a building), are identified. Based on the detected features and positional shifts between different images, locations of the objects in a 3D coordinate space can be inferred. It is common to represent the locations using a point cloud model that can be manipulated for various purposes, including visualization (e.g., rendering the scene from different viewpoints) and information management.

Machine-learning techniques have been developed to facilitate MVS. These tools generally construct a 3D cost volume to regularize and regress depth and disparity. To improve performance with high-resolution images and outputs, a cascaded approach has been used in tools such as CasMVSNet, which uses feature pyramids to encode geometry at different scales (e.g., coarse to fine), then constructs a cascade cost volume.

Further improvements in MVS are desirable.

SUMMARY OF INVENTION

Embodiments described herein relate to systems and methods for 3D image reconstruction of a scene from multi-view calibrated images. In some embodiments, image reconstruction can include performing feature extraction on a set of input images using a convolutional neural network, thereby generating feature pyramids corresponding to features at different levels of resolution. The feature pyramids can be used to compute a respective cost volume for each feature pyramid at each level of resolution, with the cost volume incorporating a learnable parameter that corresponds to a weight allocated to the "reference" feature pyramid (i.e., the feature pyramid for which cost volume is being computed) relative to other feature pyramids. A depth map for each input image can be generated based at least in part on the cost volume. The reconstruction system can be implemented as a deep learning network that is trained using sets of images for which ground truth depth maps are available, and training (including training of the learnable parameter in the cost volume computation) can use a loss function based on comparing the resulting depth maps to the ground truth depth maps.

According to some embodiments, a computer-implemented image processing method includes: obtaining a plurality of input images showing respective views of a scene from different view points; performing feature extraction on the input images to generate a plurality of feature pyramids corresponding to features at different levels of resolution; computing a respective cost volume for each of the plurality of feature pyramids at each level of resolution, wherein the cost volume includes a learnable parameter that corresponds to a weight allocated to a reference one of the feature pyramids relative to other feature pyramids in the plurality of feature pyramids; and generating a respective depth map for each of the input images based at least in part on the cost volume. The depth maps can be used to generate a three-dimensional (3D) point cloud representation of the scene, which can be used to render images for display or for other purposes.

In these and other embodiments, constructing the respective cost volume for a reference one of the feature pyramids, can include: determining a plurality of hypothesis depth planes for a reference camera frustum corresponding to the reference feature pyramid; determining a reference volume pyramid and a plurality of feature volume pyramids by warping each other one of the feature pyramids into the reference camera frustum; and fusing the reference volume pyramid and the feature volume pyramid to construct a cost volume pyramid for the reference feature pyramid, wherein fusing is based at least in part on the learnable parameter. Computing the cost volume pyramid for the reference feature pyramid can include: computing a volume for each feature pyramid; computing an average of the volumes of the feature pyramids; determining a respective matching score between a reference image corresponding to the reference feature pyramid and each of the other images in the plurality of input images; computing a first weighted sum of variances between the average volume and the volume for each feature pyramid other than the reference feature pyramid, wherein the weighted sum uses the matching scores as weights; and computing a sum of the first weighted sum and a weighted variance between the average volume and the volume for the reference feature pyramid, wherein the weight assigned to the difference between the average volume and the volume for the reference feature pyramid is the learnable parameter. In some embodiments, determining the matching score between the reference image and one of the other images can include: using a structure from motion analysis to identify matching points between the reference image and the other image; for each matching point, estimating a difference in viewing angles between the reference image and the other image; and computing the matching score based on the estimated difference in viewing angles for all of the matching points.

In these and other embodiments, performing feature extraction on the input images can include providing each input image to a 2D convolutional neural network that outputs a feature pyramid for each image. The 2D convolutional neural network uses weight sharing across the input images. In some embodiments, the 2D convolutional neural network can also include a bottom-up path that that augments the propagation of low-level features.

According to some embodiments, a computer-implemented image processing method includes: obtaining a plurality of input images showing respective views of a scene from different view points; performing feature extraction on the input images to generate a plurality of feature pyramids, wherein performing feature extraction uses a 2D convolutional neural network that includes a feature pyramid network and an added bottom-up path to augment the propagation of low-level features; computing a respective three-dimensional (3D) cost volume for each of the plurality of feature pyramids; and generating a respective depth map for each of the input images based at least in part on the 3D cost volume. In these and other embodiments, the 3D cost volume can include a learnable parameter that corresponds to a weight allocated to a reference one of the feature pyramids relative to other feature pyramids in the plurality of feature pyramids.

The following detailed description, together with the accompanying drawings, will provide a better understanding of the nature and advantages of the claimed invention.

BRIEF DESCRIPTION OF THE DRAWINGS

FIG. 4 shows pseudocode for an algorithm that can be used to compute a set of matching scores between a reference image and a set of source images according to some embodiments.

FIG. 5 shows a table summarizing the performance of various MVS tools, including an example implementation of an MVS network according to some embodiments.

DETAILED DESCRIPTION

The following description of exemplary embodiments of the invention is presented for the purpose of illustration and description. It is not intended to be exhaustive or to limit the invention to the precise form described, and persons skilled in the art will appreciate that many modifications and variations are possible. The embodiments have been chosen and described in order to best explain the principles of the invention and its practical applications to thereby enable others skilled in the art to best utilize the invention in various embodiments and with various modifications as are suited to the particular use contemplated.

Embodiments described herein include computer-implemented systems and methods that can perform multi-view stereo reconstruction of three-dimensional (3D) data (e.g., a point cloud) from a set of two-dimensional (2D) images, a process often referred to as "MVS." MVS takes as input a set of images. As used herein, an "image" refers to a record of the scene as viewed from a single camera 102, which records the image. Images can be recorded or represented as a 2D array of pixels, with each pixel corresponding to a portion of the image and having a value representing a characteristic (e.g., color) of that portion of the image. High-resolution images, e.g., having millions of pixels, may be preferred for high-quality MVS. An image set suitable as input for MVS can be collected using a variety of camera systems and techniques. In particular, images can be collected using one or more camera systems at designated (known) positions and view angles. The positions may be selected to facilitate 3D reconstruction. Different images in an image set can be captured using different cameras (operated concurrently or sequentially) and/or the same camera at different times. Each image can include associated parameters representing camera extrinsics (parameters such as location and orientation that do not depend on internal components or settings of the camera) and camera intrinsics (parameters such as focal length, aperture, resolution, and field of view, which depend on internal components or settings of the camera).

1. MVS Image Collection

Figure 1:
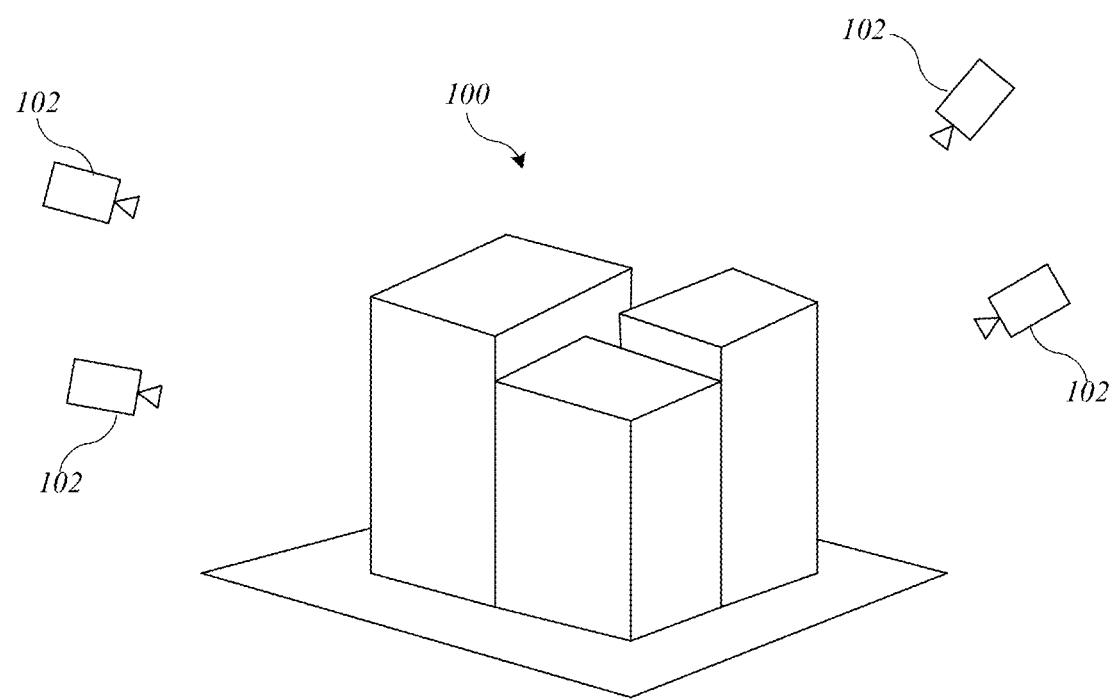
FIG. 1 shows a simplified illustration of image collection for MVS that can be used in some embodiments.

FIG. 1 shows a simplified illustration of image collection for MVS that can be used in some embodiments. Shown in FIG. 1 is a scene 100. As used herein, a "scene" refers to a region for which a 3D reconstruction of objects located therein is desirable. A scene may exist on a variety of scales, such as a room, a building, or a group of buildings such as a campus or town or the like. Objects in the scene may include buildings or surface details thereof (e.g., window recesses, ledges, etc.), vegetation (e.g., trees or bushes), other structures such as street lamps, furniture items (e.g., benches, tables), and so on. A number of cameras 102 are positioned to obtain images of scene 100 from different view points. (As used herein, a "view point" includes a location and an orientation in a global three-dimensional coordinate system; different view points can differ in location and/orientation.) In some embodiments, one camera 102 may be moved to different view points to capture images; thus, the number of view points need not be equal to the number of cameras.

In some embodiments, an image set can be collected using multiple unmanned aerial vehicles (UAVs) that carry cameras. Each UAV can be assigned a task—e.g., a particular building or area in which to collect images. A set of viewpoints can be selected, e.g., based on the surface shape of a building that the UAV is assigned to image. In some embodiments, these viewpoints can be modeled as nodes of a travelling salesman problem to find the shortest path that travel through all the viewpoints. Once a path is determined for each UAV, the UAVs can execute their assigned tasks to collect images at a set of viewpoints. Other techniques for collecting image sets can also be employed.

2. MVS Network with Learnable Cost Metric

Regardless of how the image set is collected, the task of an MVS system (also referred to as an MVS network) is to generate a depth map for one or more of the images, referred to as a "reference" image. The "depth map" can be a 2D array of pixels that stores information about the distance to the object occupying that pixel in the image. Depending on implementation, the depth information can be combined with the initial image (e.g., as an additional attribute of each pixel of the image) or stored in a separate image. Put differently. the inputs to the MVS system are multi-view images $\{I_i\}_{i=0}^{N-1} \mathbb{R}^{C \times H \times W}$ of the scene from a number (N) of viewpoints (with accompanying camera intrinsics and extrinsics), where C, H, W are the channel number, height, and width of an input image, respectively. It is assumed that the number of channels, height, and width are the same across all input images. In operation, the MVS selects one of the images as a "reference" image $I_0$ and uses $I_0$ and some or all of the other images $\{I_i\}_{i=1}^{N-1}$ as "source" images to infer the corresponding depth map D for the reference image $I_0$. In some embodiments, each image $I_i$ in the input image set $\{I_i\}_{i=0}^{N-1}$ is iteratively treated as the reference image for depth inference, and the outputs of the MVS system are the N-view depth maps $\{D_i\}_{i=0}^{N-1} \in \mathbb{R}^{H \times W}$. Depth map filtering and fusion can be applied to the depth maps to generate a 3D point cloud reconstruction of the scene.

Figure 2:
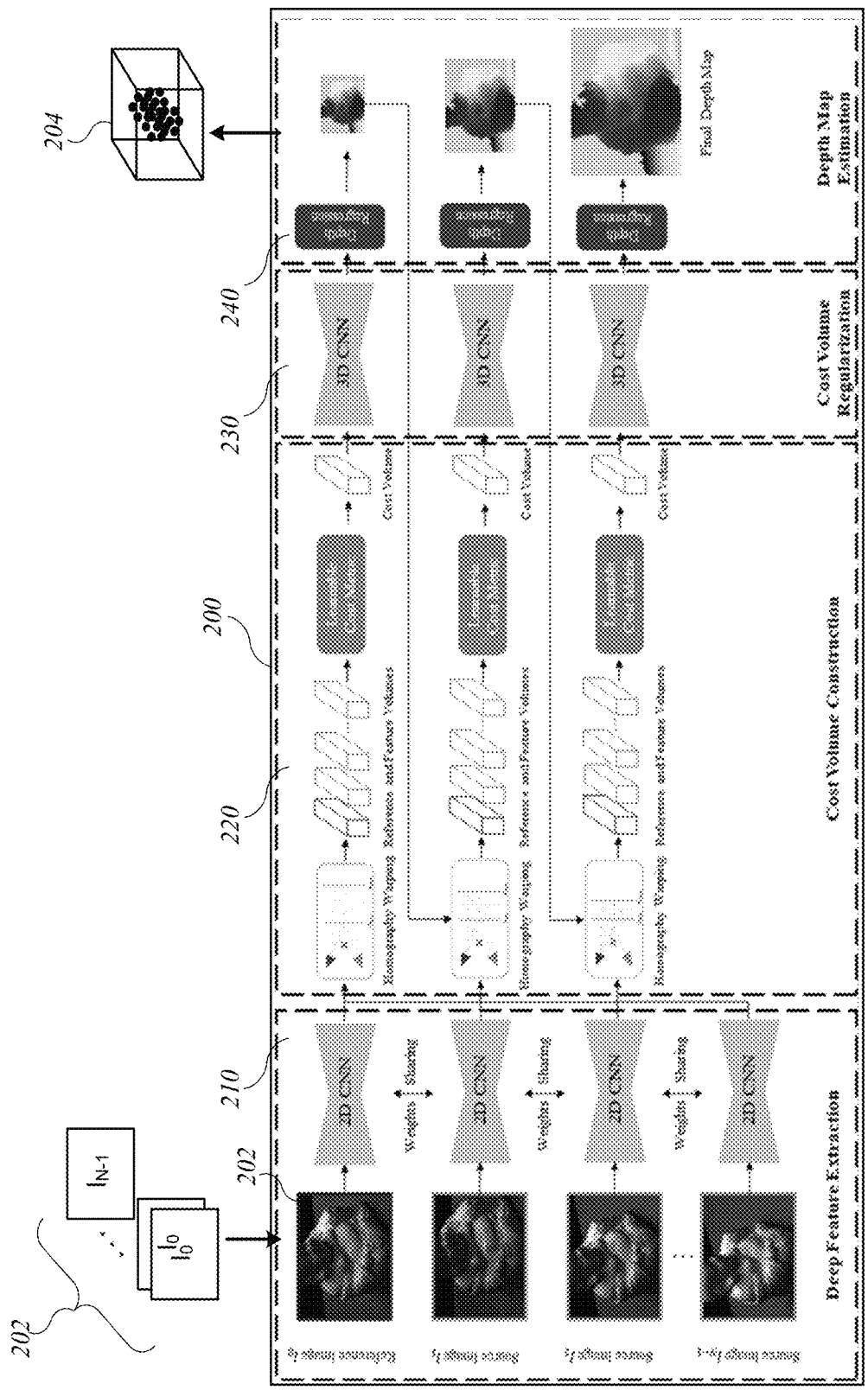
FIG. 2 shows a network flow diagram of an MVS network according to some embodiments.

FIG. 2 shows a network flow diagram of an MVS network 200 according to some embodiments. MVS network 200 is an example of a deep MVS network with learnable cost metric, sometimes referred to as "LCM-MVSNet." MVS network 200 receives as inputs a set of N source images 202, which can be multi-view images $\{I_i\}_{i=0}^{N-1}$ and outputs a set of N depth maps 204, which can be the N-view depth maps $\{D_i\}_{i=0}^{N-1}$.

MVS network 200 can be a deep-learning network that includes four stages: a deep feature extraction network 210, a cost volume construction module with a learnable cost metric (also referred to as "LCM module") 220, a cost volume regularization module 230, and a depth map regression module 240. Example implementations for each stage of MVS network 200 will now be described.

2.1. Feature Extraction Network

Deep feature extraction network 210 can be implemented using a weights-sharing 2D convolutional neural network (CNN) to extract feature pyramids from the reference image and source images. For instance, deep feature extraction network 210 can implement a feature pyramid network (FPN) to extract representative multi-scale image features for cost volume construction. Examples of FPN implementations are known in the art.

In some embodiments, the FPN can be enhanced by adding a bottom-up path to augment the propagation of low-level features and incorporate more context information for more accurate and robust feature matching. The bottom-up path includes four consecutive convolutional layers. From the bottom, each layer has 32 filters with 3×3 kernel size and pad size 1. The stride is 2 in the first and third layer, and the stride is 1 in the second and fourth layer. As shown, different input images can be processed separately in a 2D CNN with weights shared across the different images; thus, the order of input images need not affect the output. To reduce the memory requirements, the batch normalization (BN) layer and non-linear activation of a standard FPN can be replaced with in-place activated batch normalization (InPlace-ABN). This can reduce training memory footprint in a computationally efficient manner.

2.2. Cost Volume Module with Learnable Cost Metric

LCM module 220 can construct a 3D cost volume for a reference image based on the extracted feature pyramids for the reference image and other images and on the camera intrinsics and extrinsics. LCM module 220 selects one of the images as a "reference" image for which a depth map is to be generated and selects some or all of the other images can be used as "source" images that provide information for depth estimation. In some embodiments, LCM module 220 can treat each image as a reference image and produce a 3D cost volume for each image. As described below, the cost volume can be determined at different levels of resolution (e.g., from coarse to fine) corresponding to the feature pyramids.

Figure 3:
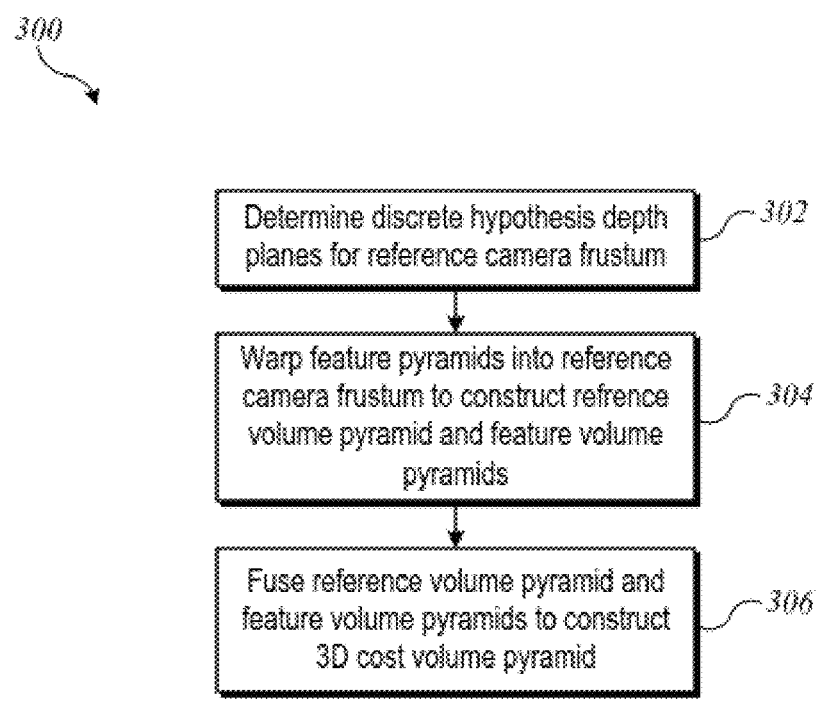
FIG. 3 shows a flow diagram of a process for constructing a cost volume for a reference image according to some embodiments.

FIG. 3 shows a flow diagram of a process 300 for constructing a 3D cost volume for a reference image according to some embodiments. Process 300 can be implemented in LCM module 220. At block 302, discrete hypothesis depth planes for the reference camera frustum are determined. At block 304, the extracted multi-view feature pyramids are warped into the reference camera frustum to construct the reference volume pyramid and feature volume pyramids corresponding to the reference view and multiple source views, respectively. At block 306, the reference volume pyramid and feature volume pyramids are fused to build up the 3D cost volume pyramid. Examples of processing at each block will now be described.

In some embodiments, MVS network 200 is an $(L_{max}+1)$-level coarse-to-fine network, with the number of levels $L_{max}$ chosen as a design parameter, and block 302 can begin with the level $L_{max}$ (coarsest level), which has coarsest feature resolution $H/2^{L_{max}} \times W/2^{L_{max}}$. At each level L, the hypothesis depth range $[d_L^{min}, d_L^{max}]$ of the scene measured at the reference view can be computed as follows:

$$d_L^{min} = d_{init} \qquad (1)$$

$$d_L^{max} = d_{init} + I_L^{inter} M_L$$

where $d_L^{min}$ is the minimum depth value at level L, $d_L^{max}$ is the maximum depth value at level L, $d_{init}$ is an initial minimum depth value of the scene, $I_L^{inter}$ is the hypothesis plane interval, and $M_L$ is the sample number of hypothesis planes. In some embodiments, the initial minimum depth value $d_{init}$ can be determined using a geometric analysis technique, such as structure from motion (SfM). For the coarsest level ($L=L_{max}$), the depth range $[d_L^{min}, d_L^{max}]$ is predefined by hypothesizing $M_L$ fronto-parallel planes of the reference view uniformly sampled at different depths across the 3D space. For the finer levels $L=L_{max}-1$ to $L=0$, the depth range $[d_L^{min}, d_L^{max}]$ is obtained by centering at the depth estimation from the previous (coarser) level and simultaneously reducing the depth interval $I_L^{inter}$ and the sample number $M_L$.

In some embodiments, block 304 can construct a feature volume pyramid for the reference image (also referred herein as a "reference volume pyramid") and feature volume pyramids for the source images using differentiable homography warping. For instance, based on the sampled hypothesis depth planes at level L, the features of the source images can be warped into the coordinate of the reference camera through differentiable homography warping to construct the feature volumes $$\lambda_i x_i^L = H_i(d_L) x_0^L \qquad (2)$$

where $x_i^L$ is the 3×1 homogeneous coordinates of the pixel in the ith source view at level L, $x_0^L$ is the 3×1 homogeneous coordinates of the pixel in reference view, and $H_i(d_L)$ is the 3×3 homography matrix at depth $d_L$, establishing the pixel correspondence between $x_i^L$ and $x_0^L$. Here, $\lambda_i$ stands for the depth of $x_i^L$ in the ith source view.

As the step that bridges 2D feature extraction and 3D cost volume regularization, the differentiable homography warping implicitly encodes the 2D image features and the camera parameters into the hypothesis planes of the reference camera to generate the feature volumes for 3D cost volume aggregation. The homography matrix $H_i(d_L)$ at depth $d_L$ for the level L is defined as follows:

$$H_i(d_L) = K_i^L R_i \left( I - \frac{(C_0 - C) n_0^T}{d_L} \right) R_0^T (K_0^L)^{-1} \qquad (3)$$

where I is the 3×3 identity matrix; $K_i^L$, $R_i$, and $C_i$ refer to the 3×3 scaled camera intrinsic matrix at level L, 3×3 camera rotation matrix, and 3×1 inhomogeneous coordinates of the camera center of the ith source view, respectively; $K_0^L$, $R_0$, and $C_0$ refer to the scaled camera intrinsic matrix at level L, rotation matrix, and inhomogeneous coordinates of the camera center of the reference view, respectively; $n_0$ denotes the principal axis of the reference camera; $d_L$ is the sampled depth value at level L; and superscript T indicates the matrix transpose.

After obtaining $\{x_i^L\}_{i=0}^{N-1}$ using the above transformations, the warping process can be achieved by leveraging differentiable bilinear interpolation to sample the image features $\{f_i^L\}_{i=0}^{N-1}$ from positions specified by $\{x_i\}_{i=0}^{N-1}$ and warp sampled features into the reference view to generate feature volumes $\{V_i\}_{i=1}^{N-1}$. The reference Volume ($V_0$) with the same dimension is acquired by repeating the features of the reference image $f_0^L$ a number $M_L$ of times.

At block 306, after obtaining the reference volume $V_0$ and the feature volume $\{V_i\}_{i=1}^{N-1}$, the N-view feature volumes are aggregated, or fused, into a single cost volume C for N-view matching similarity measurement. In some embodiments, the cost volume is constructed using as a mapping function $$\mathcal{M}: \underbrace{R^V \times \ldots \times R^V}_{N} \to R^V,$$

where V is the volume size.

Conventional approaches to cost volume construction adopt the variance-based cost metric (VCM) as the mapping function $\mathcal{M}$. The VCM is a constant function assigning equal weights to the reference volume and each feature volume when aggregating cost volume, with the assumption that volumes of all views contribute equally to the 3D cost volume.

However, images from different views have pixel differences caused by illumination changes, occlusions, and image content variations; accordingly feature volumes from different views should contribute differently to the cost volume aggregation. As the depth map of the reference image is what is being inferred, its image features should be critical to the cost volume aggregation process. Furthermore, a source image near the reference view without occlusion can offer more accurate photometric and geometric information than a far one with partial occlusion. Accordingly, in embodiments described herein, rather than assigning equal weights to the reference volume and each feature volume, the weights are treated as one or more learnable parameters.

In particular, a learnable parameter can be set for the reference volume to learn its importance ratio from the training data. A matching score measuring the feature similarity between the source image and reference image can computed, e.g., by utilizing their common sparse points obtained through structure from motion (SfM) analysis. The corresponding normalized matching score can then be adopted as the weight for each feature volume, thereby making the network adaptive to input scene variation. In some embodiments, a learnable cost metric (LCM) is defined as:

$$C = \mathcal{M}(V_0, \ldots, V_{N-1}) \quad (4)$$
$$= \alpha(V_0 - \overline{V})^2 + \sum_{i=1}^{N-1} \frac{S_i}{\sum_{i=1}^{N-1} S_i}(V_i - \overline{V})^2$$

where C represents the cost volume; N represents the number of input views; a is the learnable weight of the reference volume; $\overline{V}$ is the mean volume among N-view volumes; and $\{S_i\}_{i=1}^{N-1}$ represents the matching score between the ith source image and the reference image. In other words, Eq. (4) defines a the cost volume as a weighted sum of variances (square of the difference from the mean) of the N-view volumes. For each source volume, the weight is proportional to the matching score of the source volume and is normalized so the sum of the weights is 1. The variance of the reference volume is assigned a weight, relative to the weighted sum of source-volume variances, that is a learnable parameter.

As noted above, the matching scores $\{S_i\}_{i=1}^{N-1}$ can be computed based on SfM analysis. FIG. 4 shows an algorithm 400 that can be used to compute a set of matching scores $\{S_i\}_{i=1}^{N-1}$ between a reference image (index 0) and a set of source images (index i=1, ..., N−1) according, to some embodiments. The common 3D points between the reference image and a given source image can be identified using conventional SfM techniques that identify matching features in a pair of images (e.g., points such as a corner of an object). The camera rotation matrices and translation vectors can be determined from the known viewpoints of the different images.

The learnable cost metric of Eq. (4) is adaptive to any number of input views, independent of the order of input views, and scalable to large-scale scenarios. It is also noted that this approach is complementary to existing cost volume-based MVS approaches, in the sense that an LCM as described herein can be combined with different techniques for generating feature volumes (including known techniques) and different techniques for subsequent processing, examples of which are described below.

2.3. Cost Volume Regularization and Depth Map Regression

As shown in FIG. 2, the outputs of LCM module 220 for a particular reference image can include a cost volume at each level of resolution, and a set of cost volumes can be output using each image as the reference image. Cost volume regularization module 230 can regularize and infer the depth map pyramid of each reference image in a coarse-to-fine manner. In some embodiments, cost volume regularization module 230 can incorporate conventional operations. For instance, a multi-scale 3D CNN can be used to solve the ambiguity induced by pixel-wise cost calculation, aggregate more contextual information, and filter the noise for more accurate depth inference of the reference view.

In a more specific example, a four-scale 3D CNN is applied to regularize the noise-contaminated cost volume and output the single-channel probability volume P with the softmax operation applied along the depth dimension. In some embodiments, all of the BN layers and nonlinear activations in the 3D CNN can be replaced with InPlace-ABN to reduce training memory footprint in a computationally efficient way. The resultant probability volume P(d) contains the estimated probability of the pixels at depth d and it is useful in estimating per-pixel depth and evaluating the confidence of depth estimation. A soft argmin operation can be applied to produce a continuous and sub-pixel depth estimation D:

$$D = \sum_{d_L = d_L^{min}}^{d_L^{max}} d_L \times P(d_L), \quad (5)$$

where $d_L$ is the depth hypothesis at level L.

Depth map regression module 240 can fuse the estimated depth maps for different reference images into the final 3D point cloud. For instance, filtering can be applied to remove outliers. In some embodiments, photometric and geometric constraints can be imposed by setting the probability threshold and minimum number of consistent views respectively, where the photometric constraint estimates the multi-view matching quality and geometric constraint represents the multi-view depth consistency. These thresholds are adjustable parameters; in some embodiments, a probability threshold can be set to 0.3 to discard depth outliers, and the minimum number of consistent views can be set to 3 to reduce the depth inconsistency. After filtering, fusion of the depth maps into a final 3D point cloud can be performed using conventional techniques such as gipuma.

2.4. Training of MVS Network

MVS network 200 of FIG. 2 includes learnable parameters in deep feature extraction module 210, LCM module 220, and cost volume regularization module 230. According to some embodiments, the learnable parameters can be trained using supervised learning techniques. The training data can include MVS image sets for which ground truth depth maps are available (or can be produced). For example, the DTU data set is a multi-view stereo dataset that provides point clouds for a number of different scenes and includes a training data set and a testing data set. Ground-truth depth maps for images from these scenes can be obtained through screened Possion surface reconstruction followed by depth rendering. More generally, any image data set can be used, provided that ground truth is available. The loss function can be defined using the mean absolute error between the estimated depth map pyramid $\{D^l\}_{i=1}^{L-1}$ and ground-truth depth map pyramid $\{D_{GT}^l\}_{i=1}^{L-1}$. For instance, the loss function can be:

$$\mathcal{L} = \sum_{l=0}^{L-1} \lambda_l \sum_{p \in P} \|D_{GT}^l(p) - D^l(p)\| \quad (6)$$

where $p_{valid}$ represents the set of valid pixels in the ground-truth depth map at level l and $\lambda_l$ denotes the weight of the loss at level l. Training can be implemented using conventional supervised-learning techniques.

It should be understood that network 200 is illustrative and that variations and modifications are possible. For instance, LCM module 220 can be integrated with other MVS workflows, including variations in the feature extraction and/or cost volume regularization stages.

3. Example Implementation

A more specific example implementation will now be described. In this example, an implementation of MVS network 200 using PyTorch was defined as a three-level coarse-to-fine network after balancing the accuracy and the efficiency. Depth hypotheses are uniformly sampled from 425 mm to 935 mm. From the coarsest stage to the finest stage, the spatial resolution of the feature maps is ¼, ½, and 1 of the input image resolution respectively, and the corresponding number of depth hypotheses is set to 48, 32, 8. Accordingly, the depth interval of each stage is set to 4, 2, 1 times the depth interval at the finest stage.

The example implementation of MVS network 200 was trained using the DTU dataset, with the number of input views to 5 and the input image resolution to 640×512. The implementation of MVS network 200 was optimized with the Adam optimizer ($\beta_1$=0.9, $\beta_2$=0.999) for 60 epochs on two NVIDIA RTX 3090Ti GPUs with batch size 2 on each GPU. The cosine learning rate scheduler with an initial learning rate of 0.001 was adopted for decaying the learning rate. During the evaluation phase on DTU testing data, the input image resolution was resized to 1152×864 and the number of input views was set to 5.

Results were compared with a number of existing MVS approaches, including traditional (geometric) and machine-learning-based approaches. FIG. 5 is a table 500 summarizing the performance of each approach, including accuracy (ACC), completeness, and overall reconstruction quality. (In each case, a lower value indicates better performance.) The last row, labeled "Ours," refers to the example implementation of MVS network 200. As shown, the example implementation compares favorably with other approaches.

Figure 6:
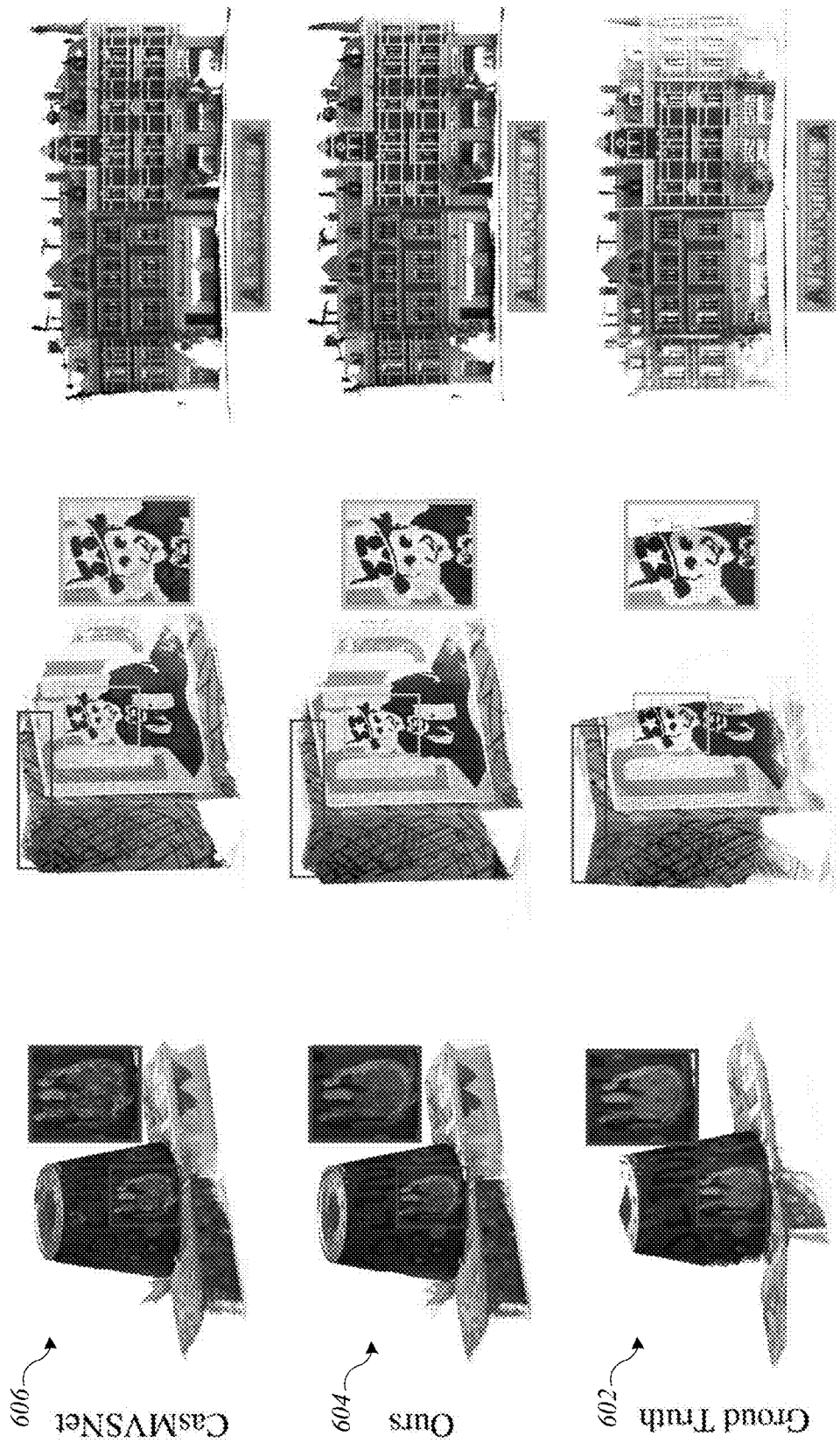
FIG. 6 shows images that provide a qualitative comparison between an implementation of a conventional MVS network and an example implementation of an MVS network according to some embodiments.

FIG. 6 shows images that provide a qualitative comparison between the example implementation and CasMVSNet, which is an existing learning-based MVS tool. Row 602 shows examples of ground truth point clouds. The corresponding point clouds produced from the example implementation (row 604) and CasMVSNet (row 606) are also shown. The example implementation achieves more clear and complete reconstruction results compared to CasMVSNet.

Figure 7:
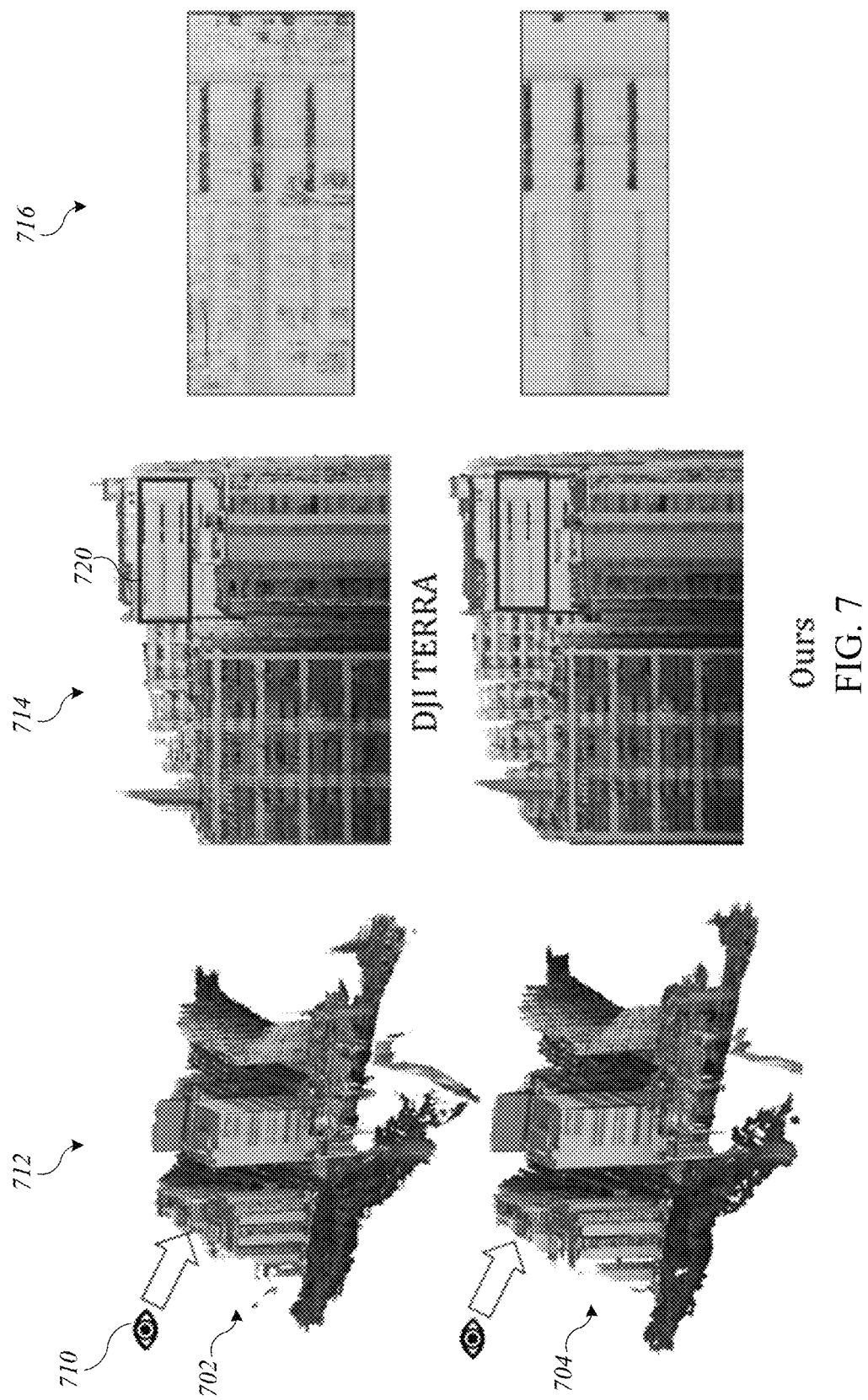
FIG. 7 shows images that provide a qualitative comparison between a commercially available MVS tool and an example implementation of an MVS network according to some embodiments.

FIG. 7 shows images that provide a qualitative comparison between the example implementation and DJI TERRA, which is a commercially available end-to-end drone mapping software product. In this case, both tools were used to reconstruct a real-world scene from the same input mages. Examples of reconstructions by DJI TERRA are shown in row 702 and corresponding reconstructions by the example implementation are shown in row 704. At left (column 712) is the complete scene; in the middle (column 714) is a view from the view point shown at 710. At right (column 716) is an expanded view of the region highlighted at 720. As can be seen, the example implementation generates qualitatively more complete reconstructions. In addition, it is noted that DJI TERRA took 6 hours and 39 mins to finish the reconstruction process, while the example implementation took only 35 mins, 11.4 times faster than DJI TERRA. In addition, DJI TERRA generated 65.8 million points while the example implementation generated 305.8 million points, which allows for a more complete reconstruction.

Figure 8:
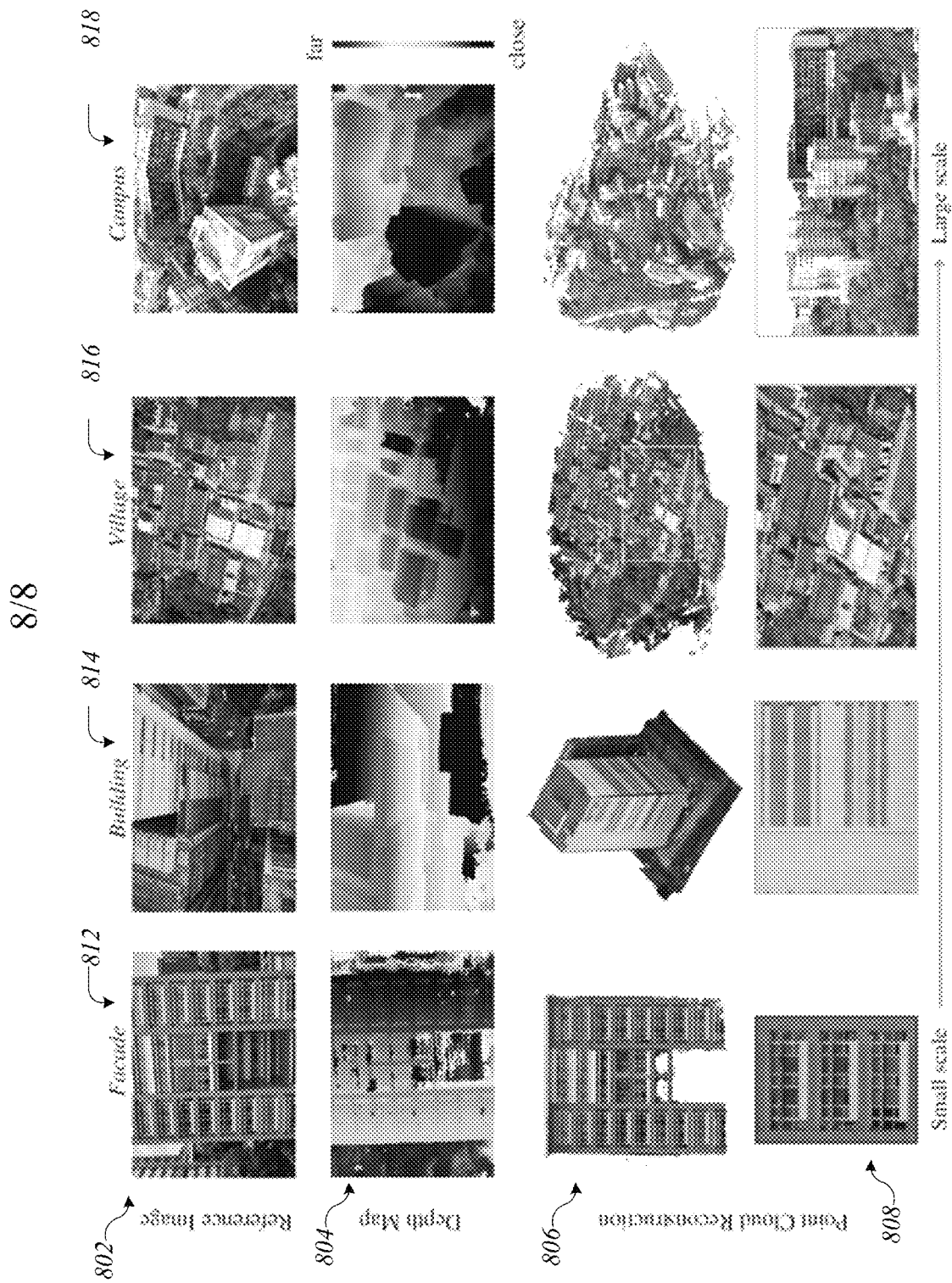
FIG. 8 shows examples from an onsite experiment using an example implementation of an MVS network according to some embodiments.

FIG. 8 shows examples from an onsite experiment using the example implementation. Row 802 shows reference images for four scenes at different scales: a building façade (column 812), an entire building (column 814), a village (column 816), and a campus (column 818). The four scenes are different in scene scale, exposure condition, and surface reflections. Row 804 shows depth maps obtained for each reference image using the example implementation. Row 806 represents the 3D point clouds for the four scenes, and row 808 shows a detail from the point cloud. The reconstruction results show that the example implementation can achieve accurate and complete 3D reconstruction for scenes at different scales.

4. Additional Embodiments

While the invention has been described with reference to specific embodiments, those skilled in the art will appreciate that numerous modifications are possible. For example, techniques described above can be applied to a variety of images of scenes at different scales. The number of levels All processes described herein are illustrative and can be modified. Operations can be performed in a different order from that described, to the extent that logic permits; operations described above may be omitted or combined; operations described sequentially may be performed in parallel; and operations not expressly described may be added. Different processes can be used separately or together in any combination or subcombination. It should also be noted that surface reconstruction and surface normal estimation techniques of the kind described herein may have applications in contexts other than cartilage analysis, including any context in which reconstruction of a surface and estimation of surface normals is desired.

In some embodiments, data visualization tools can be provided that can display renderings of 3D point clouds, depth maps, or other images constructed from a reconstructed 3D point cloud to a user. In some embodiments, the user may provide input to zoom (in or out), rotate, pan, and otherwise move a displayed rendering, and displayed renderings can move synchronously in response to user input. Options can be provided to allow the user to select a desired visualization and/or to view different versions of images, depth maps, and/or other information.

Techniques described herein can be implemented by suitable programming of general-purpose computers. A general-purpose computer can include a programmable processor (e.g., one or more microprocessors including a central processing unit (CPU) and one or more co-processors such as graphics processing units (GPUs), neural engines, or other co-processors optimized to implement nodes of a deep neural network) and memory to store instructions and data used by the programmable processor. A general-purpose computer can also include user interface components such as a display, speakers, keyboard or keypad, mouse, touch pad, track pad, joystick, touch screen, microphone, etc. A general-purpose computer can also include data communication interfaces to transmit data to other computer systems and/or receive data from other computer systems; examples include USB ports; Ethernet ports; other communication ports to which electrical and/or optical signal wires can be connected; and/or antennas and supporting circuitry to implement wireless communication protocols such as Wi-Fi, Bluetooth, NFC (near-field communication), or the like. In some embodiments, a computer system includes a single computer apparatus, where various subsystems can be components of the computer apparatus. The computer apparatus can have a variety of form factors including, e.g., a laptop or tablet computer, a desktop computer, etc. A computer system may include a monitor, printer or other suitable display for providing any of the results mentioned herein to a user. In other embodiments, a computer system can include multiple computer apparatuses, each being a subsystem, with internal components. A computer system can include a plurality of components or subsystems, e.g., connected together by external interface or by an internal interface. In some embodiments, computer systems, subsystems, or apparatuses can communicate over a network. For instance, a computer system can include a server with massive processing power to implement deep neural networks and a client that communicates with the server, providing instructions for specific network structures and operations.

It should be understood that-any of the embodiments of the present invention can be implemented in the form of control logic using hardware (e.g., an application specific integrated circuit or field programmable gate array) and/or using computer software with a programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using a programming platform such as MATLAB, or any suitable computer language such as, for example, Java, C, C++, C#, Objective-C, Rust, Golang, Swift, or scripting language such as Perl, Python, or PyTorch, using, for example, conventional or object-oriented techniques. The software code may be stored as a series of instructions or commands on a computer readable storage medium; suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable storage medium may be any combination of such storage devices or other storage devices capable of retaining stored data. Computer readable storage media encoded with the program code may be packaged with a compatible device or provided separately from other devices. Any such computer readable storage medium may reside on or within a single computer product (e.g. a hard drive, a CD, or an entire computer system), and may be present on or within different computer products within a system or network.

Such programs may also be encoded and transmitted using carrier signals adapted for transmission via wired, optical, and/or wireless networks conforming to a variety of protocols, including the Internet. As such, a computer readable transmission medium (which is distinct from a computer readable storage medium) may be created using a data signal encoded with such programs.

Any of the methods described herein may be totally or partially performed with a computer system including one or more processors, which can be configured to perform the steps. Thus, embodiments can involve computer systems configured to perform the steps of any of the methods described herein, potentially with different components performing a respective step or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects.

The above description is illustrative and is not restrictive. Many variations of the invention will become apparent to those skilled in the art upon review of the disclosure. The scope of patent protection should, therefore, be determined not with reference to the above description, but instead should be determined with reference to the following claims along with their full scope or equivalents.

What is claimed is:

1. A computer-implemented image processing method comprising:
    obtaining a plurality of input images showing respective views of a scene from different view points;
    performing feature extraction on the input images to generate a plurality of feature pyramids corresponding to features at different levels of resolution;

computing a respective cost volume for each of the plurality of feature pyramids at each level of resolution, wherein the cost volume includes a learnable parameter that corresponds to a weight allocated to a reference one of the feature pyramids relative to other feature pyramids in the plurality of feature pyramids; and generating a respective depth map for each of the input images based at least in part on the cost volume.

2. The method of claim 1 further comprising:

using the respective depth maps to generate a three-dimensional (3D) point cloud representation of the scene.

3. The method of claim 2 further comprising:

displaying an image of the scene using the 3D point cloud representation.

4. The method of claim 1 wherein constructing the respective cost volume for a reference one of the feature pyramids includes:

determining a plurality of hypothesis depth planes for a reference camera frustum corresponding to the reference feature pyramid;

determining a reference volume pyramid and a plurality of feature volume pyramids by warping each other one of the feature pyramids into the reference camera frustum; and fusing the reference volume pyramid and the feature volume pyramid to construct a cost volume pyramid for the reference feature pyramid, wherein fusing is based at least in part on the learnable parameter.

5. The method of claim 4 wherein computing the cost volume pyramid for the reference feature pyramid includes:

computing a volume for each feature pyramid;

computing an average of the volumes of the feature pyramids;

determining a respective matching score between a reference image corresponding to the reference feature pyramid and each of the other images in the plurality of input images;

computing a first weighted sum of variances between the average volume and the volume for each feature pyramid other than the reference feature pyramid, wherein the weighted sum uses the matching scores as weights; and computing a sum of the first weighted sum and a weighted variance between the average volume and the volume for the reference feature pyramid, wherein the weight assigned to the difference between the average volume and the volume for the reference feature pyramid is the learnable parameter.

6. The method of claim 5 wherein determining the matching score between the reference image and one of the other images includes:

using a structure from motion analysis to identify matching points between the reference image and the other image;

for each matching point, estimating a difference in viewing angles between the reference image and the other image; and computing the matching score based on the estimated difference in viewing angles for all of the matching points.

7. The method of claim 1 wherein performing feature extraction on the input images includes providing each input image to a 2D convolutional neural network that outputs a feature pyramid for each image.

8. The method of claim 7 wherein the 2D convolutional neural network uses weight sharing across the input images.

9. The method of claim 7 wherein the 2D convolutional neural network includes a bottom-up path that that augments the propagation of low-level features.

10. A computer system comprising:

a memory to store data including input images; and a processor coupled to the memory and configured to perform a method according to claim 1.

11. A computer-readable storage medium having stored therein program code instructions that, when executed by a processor of a computer system, cause the processor to perform a method according to claim 1.

12. A computer-implemented image processing method comprising:

obtaining a plurality of input images showing respective views of a scene from different view points;

performing feature extraction on the input images to generate a plurality of feature pyramids, wherein performing feature extraction uses a 2D convolutional neural network that includes a feature pyramid network and an added bottom-up path to augment the propagation of low-level features;

computing a respective three-dimensional (3D) cost volume for each of the plurality of feature pyramids; and generating a respective depth map for each of the input images based at least in part on the 3D cost volume.

13. The method of claim 12 wherein the 3D cost volume includes a learnable parameter that corresponds to a weight allocated to a reference one of the feature pyramids relative to other feature pyramids in the plurality of feature pyramids.

14. The method of claim 12 wherein constructing the respective cost volume for a reference one of the feature pyramids includes:

determining a plurality of hypothesis depth planes for a reference camera frustum corresponding to the reference feature pyramid;

determining a reference volume pyramid and a plurality of feature volume pyramids by warping each other one of the feature pyramids into the reference camera frustum; and fusing the reference volume pyramid and the feature volume pyramid to construct a cost volume pyramid for the reference feature pyramid, wherein fusing is based at least in part on the learnable parameter.

15. The method of claim 14 wherein computing the cost volume pyramid for the reference feature pyramid includes:

computing a volume for each feature pyramid;

computing an average of the volumes of the feature pyramids;

determining a respective matching score between a reference image corresponding to the reference feature pyramid and each of the other images in the plurality of input images;

computing a first weighted sum of variances between the average volume and the volume for each feature pyramid other than the reference feature pyramid, wherein the weighted sum uses the matching scores as weights; and computing a sum of the first weighted sum and a weighted variance between the average volume and the volume for the reference feature pyramid, wherein the weight assigned to the difference between the average volume and the volume for the reference feature pyramid is the learnable parameter.

16. The method of claim 15 wherein determining the matching score between the reference image and one of the other images includes:

using a structure from motion analysis to identify matching points between the reference image and the other image;

for each matching point, estimating a difference in viewing angles between the reference image and the other image; and computing the matching score based on the estimated difference in viewing angles for all of the matching points.

17. The method of claim 12 further comprising:

using the respective depth maps to generate a three-dimensional (3D) point cloud representation of the scene.

18. The method of claim 17 further comprising:

displaying an image of the scene using the 3D point cloud representation.

19. A computer system comprising:

a memory to store data including input images; and a processor coupled to the memory and configured to perform a method according to claim 12.

20. A computer-readable storage medium having stored therein program code instructions that, when executed by a processor of a computer system, cause the processor to perform a method according to claim 12.

* * * * *